April 4, 1950

H. BONANNI 2,502,554

MOTOR OIL COOLER

Filed Dec. 5, 1947

INVENTOR.
HENRY BONANNI,
BY
ATTORNEYS.

April 4, 1950  H. BONANNI  2,502,554
MOTOR OIL COOLER
Filed Dec. 5, 1947  2 Sheets-Sheet 2
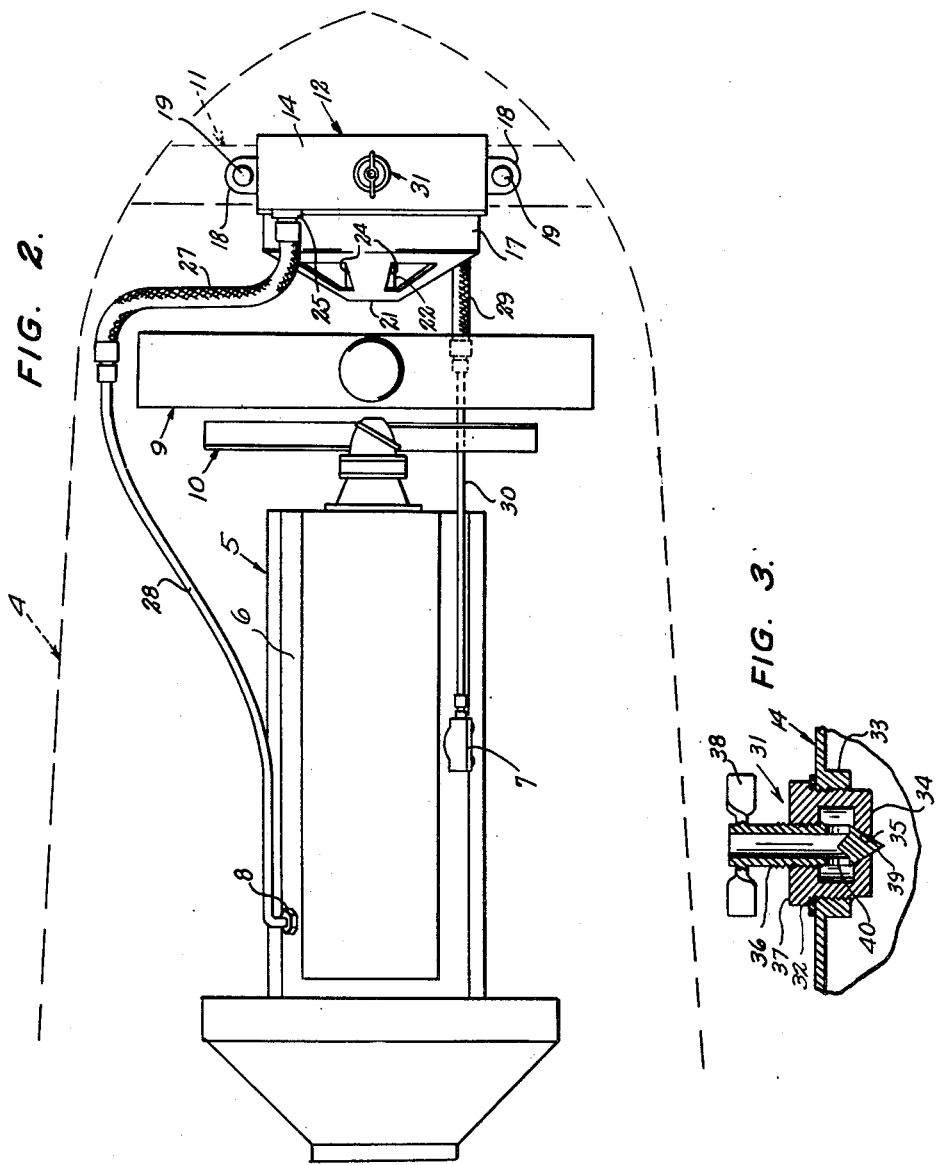
INVENTOR.
HENRY BONANNI,
BY
ATTORNEYS.

Patented Apr. 4, 1950

2,502,554

UNITED STATES PATENT OFFICE 2,502,554

MOTOR OIL COOLER

Henry Bonanni, Exeter, Pa.

Application December 5, 1947, Serial No. 789,973

2 Claims. (Cl. 123—196)

This invention relates to improvements in means for cooling the crankcase oil of internal combustion engines, and more particularly to an improved device of this kind involving an air-cooled radiator through which the oil to be cooled is circulated by the oil pump of the engine, and a supplemental fan for increasing the contact of cooling air with the radiator, the primary object of the invention being to provide a more practical and efficient device of this kind, which is readily adaptable to use on different types of internal combustion engines, such as gasoline, Diesel, and gas, whether such engines be of the stationary type or mounted on automotive vehicles, including boats.

Another important object of the invention is the provision of a device of the above-indicated character which is not dependent for its cooling effect upon the contact with its radiator of cooling air produced by the engine fan, or upon contact with its radiator of cooling air resulting from forward motion of a vehicle upon which the device may be installed.

Another important object of the invention is the provision of a device of the character indicated above which, while capable of utilizing some of the cooling effect of air impinged upon its radiator as a result of forward motion of a vehicle upon which the device is installed, can effectively produce sufficient impingement of cooling air upon its radiator even when the device is installed on a stationary engine, or during such periods as a vehicle upon which it is installed may be stationary or only moving slowly, as during city driving, or in a traffic tieup, and forward motion is insufficient or is lacking to produce an adequate flow of cooling air upon the radiator.

Another important object of the invention is to provide a device of the character indicated above comprising a novel unitary combination of radiator and fan which is adapted to be installed as a unit on the engine or its associated structure, and in which the fan is arranged to draw cooling air through the oil-cooling radiator from one side thereof.

Other important objects and advantageous features of the invention will be apparent from the following description and accompanying drawings, wherein a non-limiting example of the invention is set forth in detail.

In the drawings:

Figure 2 is a top plan view of Figure 1.

Figure 3 is an enlarged fragmentary vertical sectional detail of the air valve of the oil-cooling radiator.

Figure 1:
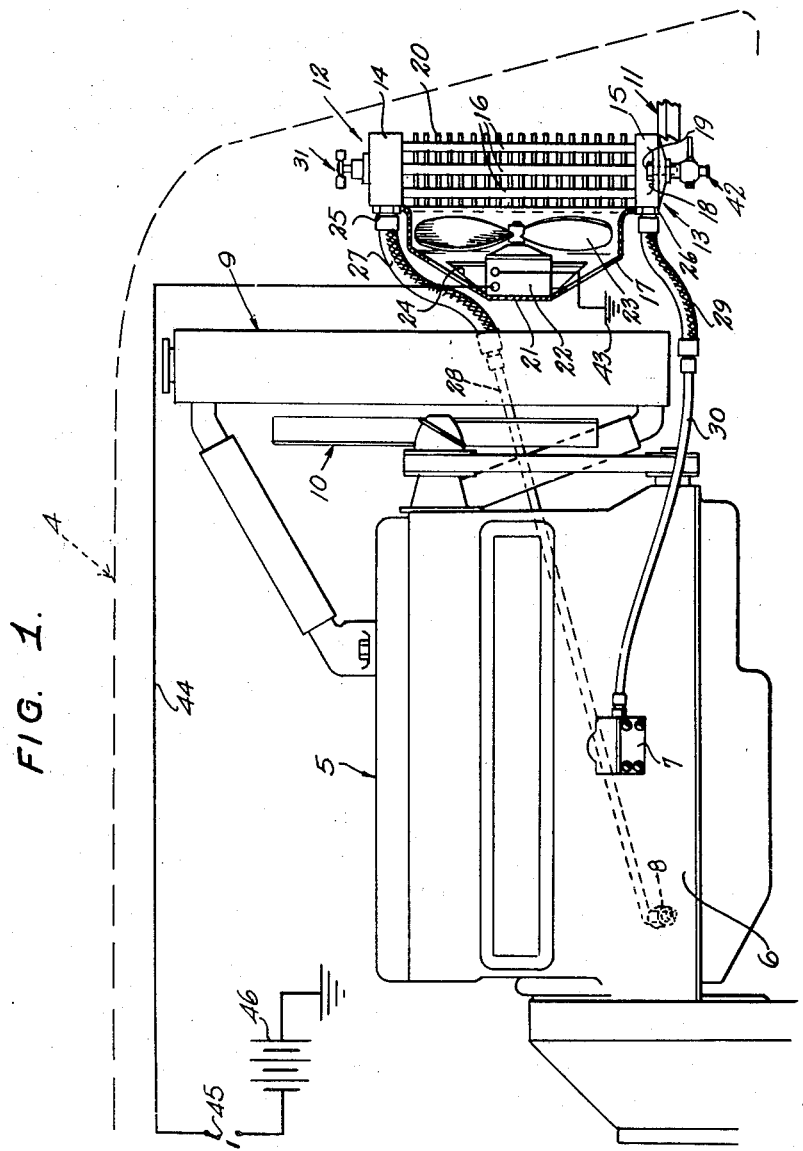
Figure 1 is a side elevation showing an arrangement in accordance with the present invention involving installation of the air-cooling device in front of the radiator of an automobile engine.

Referring in detail to the drawings, the numeral 4 generally designates the forward engine compartment of an automobile, enclosing the internal combustion engine 5, including the upper crankcase section 6 which has the usual crankcase oil-circulating pump 7 on one side and a crankcase oil inlet 8 on its opposite side, the engine-cooling system radiator 9 in front of the engine, and the usual fan 10 located between the radiator 9 and the engine 5. In front of the radiator 9 is a support member 11 found in various forms on different makes and types of automobiles.

In accordance with the present invention, the unitary oil-cooling device, generally designated at 12, is mounted in front of the engine-cooling system radiator 9 on the support member 11, with the aim that said device will be advantageously exposed to the cooling effect of rearwardly moving air whenever the automobile is in forward motion, without being dependent upon such cooling air for its adequate functioning.

The unitary oil-cooling device 12 comprises a frame 13 of generally rectangular shape consisting of an enclosed hollow upper transverse member 14, a similar enclosed hollow lower transverse member 15, laterally-spaced, vertical elements 16 extending between and connected to the upper and lower transverse members, and a frusto-conical fan housing 17 located centrally behind and connected to and between said upper and lower transverse members, with its axis arranged horizontally. The lower transverse member 15 has outwardly-projecting ears 18 which are bolted, as indicated at 19, to the support member 11, whereby the device is supported as a unit upon said support member 11.

The device 12 further comprises a generally rectangular radiator 20 mounted in and supportably connected to the upper and lower transverse frame members 14 and 15, respectively, between the frame sides constituted by the spaced vertical elements 16, with its rear side substantially flush with the juncture of said transverse members with the frusto-conical fan housing 17 as shown in Figure 1.

Axially mounted on the frustum 21 of the fan housing is an electric motor 22 carrying a fan 23 close to the back of the radiator 20 in the flaring forward end of the fan housing, the motor 22, fan 23, and radiator 20 being closely spaced to achieve a compact, mechanically efficient, and structurally well integrated arrangement, affording reduction in over-all mass and dimensions of the device. The electric motor 22 turns in a direction to suck air rearwardly through the radiator 20, and the capacity of the fan and the speed of the motor are such as to draw sufficient cooling air through the radiator to produce adequate cooling of oil therein, even when the cooling of the radiator is not augmented by air produced by forward motion of the automobile. The sides of the fan housing 17 have sufficiently large segmental openings 24 therein to preclude the building up of any back air pressure in the housing and to assure unobstructed rearward travel of air from the fan, for the dual purpose of obtaining maximum cooling of the oil radiator 20, and of eliminating any reduction in efficiency of the engine-cooling system radiator 9 which might otherwise obtain because of the location of the oil-cooling device forward thereof on the automobile.

The upper and lower transverse frame members 14 and 15, respectively, may be in the nature of headers, from the back of which, at opposite ends thereof, project engine crankcase oil outlet and inlet nipples 25 and 26, respectively. An upper flexible hose 27 is connected at one end to the upper oil radiator outlet nipple 25 and is connected at its opposite end to a pipe 28 connecting with the crankcase inlet 8 on one side of the upper crankcase section 6. A lower flexible hose 29 is connected at one end to the lower radiator oil inlet 26 and at the other end to a pipe 30 connected with the output side of the engine oil-circulating pump 7 on the opposite side of the upper engine crankcase section 6. As shown in Figure 2, the oil outlet tube, comprising the flexible hose 27 and pipe 28, may conveniently be brought around the side of the engine radiator 9 adjacent to that toward which the oil radiator outlet nipple is located, while the inlet tube comprising the lower flexible hose 29 and the pipe 30 may be extended directly rearwardly with the tube deflected only slightly to pass beneath the radiator 9, as shown in Figure 1, so that no obstruction of or encumbering of the engine compartment 4 results.

The upper oil radiator header 14, as shown in Figure 3, is provided near its middle with an air valve 31 which may suitably comprise a bushing 32 screwed into a sleeve portion 33 on the top of the header, the bushing having a bottom wall 34 imperforate except for a conical seat 35 opening into the interior of the header, with a tubular valve stem 36 screwed into the top wall 37 of the bushing. The exposed and open upper end of the valve stem has turning wings 38 for manual opening and closing of the valve, and the lower end of the stem has a conical valve element 39 for engagement with the seat 35, the sides of the stem having openings 40 which establish communication through the bore 41 of the stem 36, with outside atmosphere, when the valve element 39 is raised from the seat 35, whereby any air trapped in the radiator 20 can escape. A spigot-type drain-out valve 42 is provided on the lower header 15.

The electric motor 22 may have one side grounded to the automobile frame, as indicated at 43, and have its remaining side connected by a wire 44 leading to a switch 45, connected to the automobile battery 46 and located for convenient operation by the driver of the automobile, so that the fan 23 can be shut off at will or when the automobile is traveling at such speed that the oil in the oil radiator 20 is sufficiently cooled by the accompanying rearward movement of air through the radiator.

I claim:

1. In a motor oil cooler for an internal combustion engine provided with a crankcase having an oil-inlet port and an oil pump for drawing oil from the crankcase, a radiator connected to the engine with an engine-driven fan disposed rearwardly of said radiator, and support means for supporting said engine and radiator, and said motor oil cooler comprising a second radiator forming a frame supported upon said support means and having an upper and a lower header with radiator tubes extending therebetween, the improvement which includes a fan housing spaced a short distance forwardly of the first-mentioned radiator and located rearwardly of the second radiator and supported from the upper and lower headers thereof, the second radiator being forwardly open to the outside air, a second independent motor-driven suction fan disposed in the fan housing immediately rearwardly of the second radiator for drawing air through the latter, an oil-outlet conduit connected at one end to the upper header of said second radiator and connected at the rear end thereof to the crankcase oil-inlet port, and an oil-inlet conduit connected at one end thereof to the lower header of said second radiator and at the rear end thereof connected to said oil pump.

2. In a motor oil cooler for an internal combustion engine provided with a crankcase having an oil-inlet port and an oil pump for drawing oil from the crankcase, a radiator connected to the engine with an engine-driven fan disposed rearwardly of said radiator, and support means for supporting said engine and radiator, and said motor oil cooler comprising a second radiator forming a frame supported upon said support means and having an upper and a lower header with radiator tubes extending therebetween, the improvement which includes a frusto-conical fan housing spaced a short distance forwardly of the first-mentioned radiator and located rearwardly of the second radiator with the larger end facing the latter, said frusto-conical fan housing being supported from the upper and lower headers of said second radiator, the latter being forwardly open to the outside air, a second independent motor-driven suction fan disposed in said frusto-conical fan housing immediately rearwardly of the second radiator for drawing air through the latter, an oil-outlet conduit connected at one end to the upper header of said second radiator and extending rearwardly past the first-mentioned radiator and connected at the rear end thereof to the crankcase oil-inlet port, and an oil-inlet conduit connected at one end thereof to the lower header of said second radiator and extending past said first-mentioned radiator and at the rear end thereof connected to said oil pump.

HENRY BONANNI.

REFERENCES CITED

The following references are of record in the file of this patent:

UNITED STATES PATENTS

| Number | Name | Date |
|---|---|---|
| 1,717,716 | MacKintosh | June 18, 1929 |
| 1,895,503 | Will | Jan. 31, 1933 |
| 2,127,192 | Toth | Aug. 16, 1938 |